(12) United States Patent
Cho et al.

(10) Patent No.: US 11,385,398 B2
(45) Date of Patent: Jul. 12, 2022

(54) BACKLIGHT UNIT AND DISPLAY APPARATUS HAVING THE SAME

(71) Applicant: SAMSUNG ELECTRONICS CO., LTD., Suwon-si (KR)

(72) Inventors: Jin Hyun Cho, Suwon-si (KR); Ki Hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/276,564

(22) PCT Filed: Apr. 5, 2019

(86) PCT No.: PCT/KR2019/004107
§ 371 (c)(1),
(2) Date: Mar. 16, 2021

(87) PCT Pub. No.: WO2020/059993
PCT Pub. Date: Mar. 26, 2020

(65) Prior Publication Data
US 2022/0050240 A1    Feb. 17, 2022

(30) Foreign Application Priority Data
Sep. 17, 2018    (KR) .......... 10-2018-0110650

(51) Int. Cl.
*F21V 8/00*    (2006.01)
*G02B 5/30*    (2006.01)
(Continued)

(52) U.S. Cl.
CPC ......... *G02B 6/0056* (2013.01); *G02B 5/3016* (2013.01); *G02B 6/005* (2013.01);
(Continued)

(58) Field of Classification Search
CPC .... G02B 6/0056; G02B 5/3016; G02B 6/005; G02B 5/30; G02B 6/0081; G02F 1/0136;
(Continued)

(56) References Cited

U.S. PATENT DOCUMENTS 8,698,980 B2    4/2014    Chao et al.

FOREIGN PATENT DOCUMENTS

CN        104155714 B  *  5/2017  ............... G02B 6/00
KR    10-2016-0146263 A    12/2016
(Continued)

OTHER PUBLICATIONS

Jin-Hun Kim et al., "Bistable switching between homeotropic and focal-conic states in an ion-doped chiral nematic liquid crystal cell", Optics Express, vol. 25, No. 23, Nov. 13, 2017, pp. 29180-29188, 10 pages total.

(Continued)

*Primary Examiner* — Donald L Raleigh
(74) *Attorney, Agent, or Firm* — Sughrue Mion, PLLC

(57) ABSTRACT

A backlight unit includes a light guide plate; a light source provided on a side surface of the light guide plate, and configured to inject light into the light guide plate; a circular polarizing reflective layer provided on a front surface of the light guide plate, and configured to reflect a first polarizing component and transmit a second polarizing component among components of light emitted from the light guide plate; and a cholesteric liquid crystal layer provided on the front surface of the circular polarizing reflective layer and including a plurality of regions, and configured to reflect or transmit the second polarizing component that has passed through the circular polarizing reflective layer according to a voltage applied to each of the plurality of regions.

15 Claims, 15 Drawing Sheets

(51) Int. Cl.
  *G02F 1/01*    (2006.01)
  *G02F 1/137*   (2006.01)
(52) U.S. Cl.
  CPC ............ *G02F 1/0136* (2013.01); *G02F 1/137* (2013.01); *G02F 2203/02* (2013.01); *G02F 2203/07* (2013.01)
(58) Field of Classification Search
  CPC ... G02F 1/137; G02F 2203/02; G02F 2203/07
  See application file for complete search history.

(56) References Cited

FOREIGN PATENT DOCUMENTS

| KR | 10-2018-0053989 A | 5/2018 | |
| WO | WO-9722834 A1 * | 6/1997 | ............... F21V 5/02 |
| WO | 2017/175852 A1 | 10/2017 | |

OTHER PUBLICATIONS

International Search Report dated Aug. 12, 2019 issued by the International Searching Authority in counterpart International Application No. PCT/KR2019/004107 (PCT/ISA/210).

* cited by examiner

BACKLIGHT UNIT AND DISPLAY APPARATUS HAVING THE SAME

CROSS-REFERENCE TO RELATED APPLICATIONS

This application is a National Stage of International Application No. PCT/KR2019/004107, filed Apr. 5, 2019, claiming priority based on Korean Patent Application No. 10-2018-0110650, filed Sep. 17, 2018, the contents of all of which are incorporated herein by reference in their entirety.

TECHNICAL FIELD

The present disclosure relates to a backlight unit and a display apparatus including the backlight unit.

BACKGROUND ART

A display apparatus that converts acquired or stored electrical information into visual information and displays the visual information to a user, has been widely used in various fields, for example, at home and in a workplace. The display apparatus may display a still image or a moving image to a user by using various display devices. Examples of the display devices include a cathode ray tube (CRT), a liquid crystal display (LCD), a light emitting diode (LED), an organic light emitting diode (OLED), an active-matrix organic light emitting diode, or E-paper.

The display apparatus includes backlight units. Types of the backlight units may include an edge-type backlight unit with a light source installed on the side of a liquid crystal panel to provide light to the liquid crystal layer, and a direct-type backlight unit with the light source to provide light directly from a bottom of the liquid crystal panel. Since the edge-type backlight unit provides light using a light guide plate, there is an advantage in that a thickness of the display apparatus can be reduced.

However, the edge-type backlight unit has a problem in that it is difficult to control the light emitted for each region of a screen.

DISCLOSURE

Technical Problem

An aspect of the present disclosure is to provide a backlight unit capable of implementing local dimming in a matrix form using a cholesteric liquid crystal layer that can be switched for each region, and a display apparatus including the backlight unit.

Technical Solution

An aspect of the disclosure provides a backlight unit including: a light guide plate; a light source provided on a side surface of the light guide plate, and configured to inject light into the light guide plate; a circular polarizing reflective layer provided on a front surface of the light guide plate, and configured to reflect a first polarizing component and transmit a second polarizing component among components of light emitted from the light guide plate; and a cholesteric liquid crystal layer provided on the front surface of the circular polarizing reflective layer and including a plurality of regions, and configured to reflect or transmit the second polarizing component that has passed through the circular polarizing reflective layer according to a voltage applied to each of the plurality of regions.

The cholesteric liquid crystal layer may include a first electrode provided on an upper surface of the cholesteric liquid crystal layer and a second electrode provided on a lower surface of the cholesteric liquid crystal layer for selectively applying a voltage to the each of the plurality of regions. The each of the plurality of regions may be configured to change to one of a planar state, a homeotropic state, or a focal conic state according to the applied voltage.

The circular polarizing reflective layer is a cholesteric liquid crystal layer having a helical structure in the same direction as the first polarizing component.

The backlight unit may further include a quantum dot sheet provided on the front surface of the cholesteric liquid crystal layer. The light source is a blue light emitting diode (LED).

The first polarizing component is right-circular polarization or left-circular polarization. The second polarizing component is circular polarization opposite to the first polarizing component.

Another aspect of the disclosure provides a backlight unit including: a light guide plate; a light source provided on a side surface of the light guide plate, and configured to inject light into the light guide plate; a first cholesteric liquid crystal layer provided on the front surface of the light guide plate and divided into a first plurality of regions, and configured to selectively change states of the first plurality of regions to reflect or transmit a specific polarizing component among components of light emitted from the light guide plate; and a second cholesteric liquid crystal layer provided on the front surface of the first cholesteric liquid crystal layer and divided into a second plurality of regions, and configured to selectively change states of the second plurality of regions to reflect or transmit light transmitted through the first cholesteric liquid crystal layer.

The first cholesteric liquid crystal layer and the second cholesteric liquid crystal layer may be configured to have helical structures in opposite directions to each other.

Each of the first plurality of regions of the first cholesteric liquid crystal layer and each of the second plurality of regions of the second cholesteric liquid crystal layer may be configured to change to one of a planar state, a homeotropic state, or a focal conic state according to an applied voltage.

The first cholesteric liquid crystal layer may include a first electrode provided on an upper surface of the first cholesteric liquid crystal layer and a second electrode provided on a lower surface of the first cholesteric liquid crystal layer for selectively applying a voltage to each of the first plurality of regions. The second cholesteric liquid crystal layer may include a third electrode provided on an upper surface of the second cholesteric liquid crystal layer and a fourth electrode provided at a lower surface of the second cholesteric liquid crystal layer for selectively applying a voltage to each of the second plurality of regions.

The backlight unit may further include a quantum dot sheet provided on the front surface of the second cholesteric liquid crystal layer. The light source is a blue light emitting diode (LED).

Another aspect of the disclosure provides a display apparatus including: a backlight unit; and a display panel provided in front of the backlight unit. The backlight unit may further include a light guide plate; a light source provided on a side surface of the light guide plate, and configured to inject light into the light guide plate; a circular polarizing reflective layer provided on a front surface of the light guide plate, and configured to reflect a first polarizing component and transmit a second polarizing component among components of light emitted from the light guide plate; and a cholesteric liquid crystal layer provided on the front surface of the circular polarizing reflective layer and including a plurality of regions, and configured to reflect or transmit the second polarizing component that has passed through the circular polarizing reflective layer according to a voltage applied to each of the plurality of regions.

The cholesteric liquid crystal layer may include a first electrode provided on an upper surface of the cholesteric liquid crystal layer and a second electrode provided on a lower surface of the cholesteric liquid crystal layer for selectively applying a voltage to the each of the plurality of regions. The each of the plurality of regions may be configured to change to one of a planar state, a homeotropic state, or a focal conic state according to the applied voltage.

The circular polarizing reflective layer is a cholesteric liquid crystal layer having a helical structure in the same direction as the first polarizing component.

The backlight unit may further comprise a quantum dot sheet provided on the front surface of the cholesteric liquid crystal layer. The light source is a blue light emitting diode (LED).

The first polarizing component is right-circular polarization or left-circular polarization. The second polarizing component is circular polarization opposite to the first polarizing component.

Advantageous Effects

According to the backlight unit and the display apparatus including the backlight unit of an embodiment, it is possible to improve the contrast or contrast ratio of a screen by implementing local dimming in a matrix form using a cholesteric liquid crystal layer that can be switched for each region.

MODES OF THE INVENTION

Figure 1:
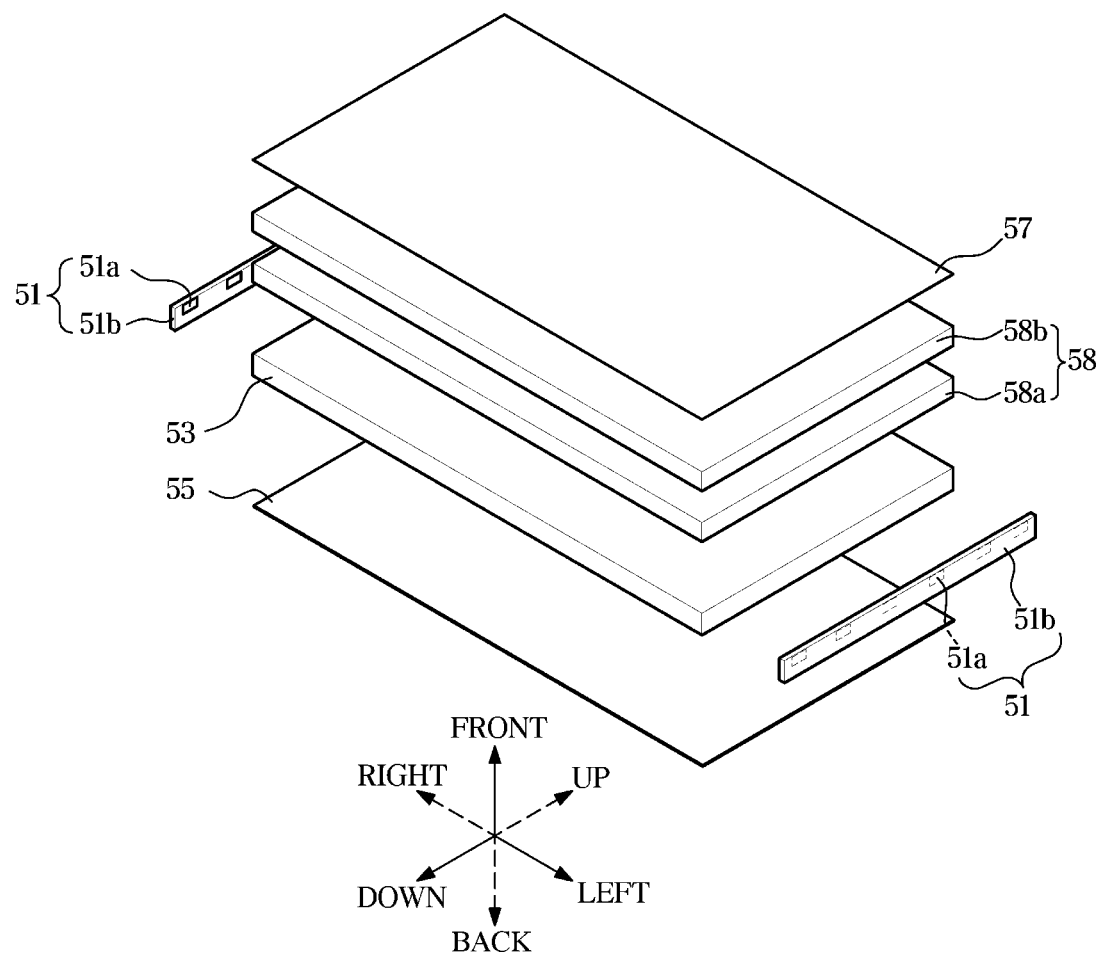
FIGS. 1 and 2 are views illustrating a structure of a backlight unit according to an embodiment.

Embodiments described herein and configurations illustrated in the accompanying drawings are only certain examples of the disclosure, and various modifications may be made at the time of filing of the present application to replace the embodiments and drawings of the present specification.

The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements. In addition, although the terms including ordinal numbers such as "first" or "second" may be used herein to describe various elements, the elements should not be limited by such terms. The terms are used only for the purpose of distinguishing one component from another. For example, without departing from a scope of the disclosure, a first component may be referred to as a second component, and similarly, the second component may also be referred to as the first component.

In the present specification, the terms such as "comprising," "having" or "including" are intended to designate the presence of characteristics, numbers, steps, operations, elements, parts or combinations thereof, and shall not be construed to preclude any possibility of the presence or addition of one or more other characteristics, numbers, steps, operations, elements, parts or combinations thereof.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Hereinafter, an embodiment of the disclosure will be described in detail with reference to the accompanying drawings. The same reference numbers or reference numerals illustrated in the accompanying drawings may indicate parts or components that perform substantially the same function.

To briefly define the terms used herein, white light may refer to light in which red light, green light and blue light are mixed, or blue light and yellow light are mixed. In addition, natural light may refer to light in which light of all wavelengths corresponding to a visible light range is mixed.

Figure 2:
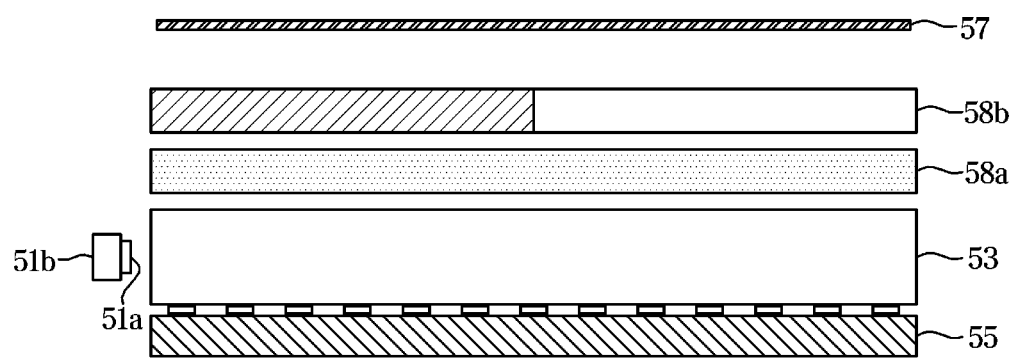

FIGS. 1 and 2 are views illustrating a structure of a backlight unit according to an embodiment.

Referring to FIGS. 1 and 2, a backlight unit 50 may include a point light source for emitting monochromatic light or white light, and may refract, reflect, and scatter the light to convert the light emitted from the point light source into uniform surface light. Accordingly, the backlight unit 40 may emit the uniform surface light toward the front by refracting, reflecting, and scattering the light emitted from the light source.

The backlight unit 50 may be classified into a direct-type backlight unit and an edge-type backlight unit according to a position of the light source. Hereinafter, the edge-type backlight unit will be described as an example.

The edge-type backlight unit 50 may include a light emitting module 51 (e.g., light emitter) for generating light, a light guide plate 53 for spreading light, a reflective sheet 55 for reflecting light, a light regulator 58 for blocking or transmitting the light output from the light guide plate 53, and a quantum dot sheet 57 for receiving light from the light regulator 58 and outputting white light. In addition, the backlight unit 50 may include an optical sheet provided between the light guide plate 53 and the light regulator 58 to improve brightness.

The light emitting module 51 may include a plurality of light sources 51a for emitting light and a support 51b for supporting and fixing the plurality of light sources 51a. The plurality of light sources 51a may be uniformly disposed on the side of the backlight unit 50 and may emit light toward the center of the backlight unit 50.

The plurality of light sources 51a may be disposed at equal intervals so that the light emitted by the plurality of light sources 51a has as uniform luminous intensity as possible. For example, the plurality of light sources 51a may be disposed on the left and right sides of the backlight unit 50 at equal intervals, respectively. However, the arrangement of the light source 51a is not limited thereto, and may be arranged only on any one of the left and right sides of the backlight unit 50.

The light source 51a may be an element configured to emit monochromatic light (light having a specific wavelength, for example, blue light) or white light (i.e., light mixed with light of various wavelengths) in various directions based on power being supplied. Since the backlight unit 50 includes the quantum dot sheet 57, a monochromatic light, in particular, the light source that outputs blue light having a short wavelength, may be used as the light source 51a. When the light emitting module 51 is implemented as the monochromatic light source 51a, there is an effect of reducing manufacturing cost. Hereinafter, it is assumed that the light source 51a outputs blue light.

The light source 51a may be implemented as a light emitting diode (LED) or a cold cathode fluorescent lamp (CCFL) having a small amount of heat. For example, the light source 51a may be implemented as a blue LED that emits blue light, which is high energy light. The blue LED may be made of an indium-gallium-nitrogen compound (InGaN) in which indium (In) is added to a gallium-nitrogen compound (GaN).

The support 51b may fix the plurality of light sources 51a so that the positions of the light sources 51a are not changed. In addition, the support 51b may supply power to each light source 51a so that each the light sources 51a emit light.

The support 51b may be disposed on the side of the backlight unit 50 together with the light source 51a. However, the position at which the support 51b is disposed is not limited, and may be disposed only on one of the left and right sides of the backlight unit 50. The support 51b may be made of a synthetic resin comprising a conductive power supply line for fixing the plurality of light sources 51a and supplying power to the light source 51a, or a printed circuit board (PCB).

The light guide plate 53 may change a proceeding direction of the light incident from the light emitting module 51 disposed on the side, and emit light toward the front. In addition, the light guide plate 53 disperses the light incident from the light emitting module 51 on the side to a front surface 53a of the light guide plate 53 to emit light.

In order to change the proceeding direction of the light, a plurality of convex stripes may be formed on the front surface 53a of the light guide plate 53, and a plurality of dots may be formed on a rear surface 53b of the light guide plate 53. In addition, the size and spacing of the convex stripes may be adjusted so that uniform light is emitted toward the front surface 53a of the light guide plate 53, and the size and spacing of the dots may be adjusted. In addition, the convex stripes on the front surface 53a of the light guide plate 53 may be formed as embossed through a printing technique, and the dots on a back side 53b of the light guide plate 53 may be formed in an intaglio using a laser.

Since the light emitting module 51 is disposed on the side of the backlight unit 50, non-uniformity of brightness may occur depending on the position of the light emitting module 51. The light guide plate 53 may spread the light emitted from the light emitting module 51 in the light guide plate 53 in order to remove non-uniformity in brightness due to the position of the light emitting module 51. For example, in order to spread light, the light guide plate 53 may have a milky color. In addition, the backlight unit 50 may further include an optical sheet such as a prism sheet to improve brightness.

Some of the light incident into the light guide plate 53 may be scattered by dots formed on the rear surface 53b of the light guide plate 53 to be emitted to the front surface 53a of the light guide plate 53. Some are reflected into the light guide plate 53 by the reflective sheet 55 provided on the rear surface 53b of the light guide plate 53. In addition, some of the reflected light may move to the center of the light guide plate 53 and may be scattered from the center of the light guide plate 53 to be emitted to the front surface 53a of the light guide plate 53. The light guide plate 53 may be composed of poly methyl methacrylate (PMMA) or transparent polycarbonate (PC).

The reflective sheet 55 may be provided at the rear of the light guide plate 53, and may reflect light emitted through the rear surface 53b of the light guide plate 53 toward the light guide plate 53. The reflective sheet 55 may be manufactured by coating a base material with a material having a high reflectance. For example, the reflective sheet 320 may be manufactured by coating a base material such as polyethylene terephthalate (PET) with a polymer having a high reflectance.

The quantum dot sheet 57 may convert the light emitted from the front of the light regulator 58 into white light. The quantum dot sheet 57 may include a fluorescent member including quantum dots, and a barrier film that blocks the quantum dots from being exposed to oxygen or moisture. The barrier film may be provided on the front and rear surfaces of the fluorescent member.

The quantum dot may refer to a small sphere-shaped semiconductor particle of nanometer size, and may be composed of a core of several nanometers to tens of nanometers in size and a shell composed of zinc sulfide (ZnS). The core of the quantum dot may be formed of cadmium selenite (CdSe), cadmium telluride (CdTe), or cadmium sulfide (CdS).

The quantum dot may emit light by themselves based on a voltage being applied, or absorb light and emit light of the specific wavelength. Electrons of the quantum dot may be located at a low energy level (or band) in a stable state. At this time, when the quantum dot absorbs light from the outside, the electrons having the low energy level may move to a high energy level (or band). Since the electrons located at the high energy level are unstable, the electrons naturally move from the high energy level to the low energy level. As such, while moving from the high energy level to the low energy level, the electrons emit light equal to an energy difference between the high energy level and the low energy level. At this time, the wavelength of the emitted light may be determined by the energy difference between the high energy level and the low energy level.

The smaller the size of the quantum dot, the shorter wavelength light may be emitted, and the larger the size, the longer wavelength light may be emitted. For example, the quantum dot with a diameter of 2 nanometers [nm] may emit blue light, and the quantum dot with a diameter of approximately 10 nanometers [nm] may emit red light. In addition, when the quantum dots of various sizes are used, the quantum dots may output light of various wavelengths from red light to blue light. In other words, when the quantum dots of various sizes are used, white light may be generated. The fluorescent member of the quantum dot sheet 57 may be manufactured by dispersing the above-described quantum dots in a resin. The resin may be formed of a polymer acrylate resin material.

The barrier film may include a transparent film formed of polyethylene terephthalate (PET) and provided to protect the fluorescent member from an external force, and a barrier layer coated on the transparent film to prevent moisture and oxygen from penetrating the fluorescent member. The barrier layer may also be composed of silicon oxide (SiO or $SiO_2$) to be transparent.

In addition, the backlight unit 50 may include the light regulator 58 that is provided between the light guide plate 53 and the quantum dot sheet 57 and transmit or block the light emitted from the light guide plate 53.

The light regulator 58 may be provided on the front surface of the light guide plate 53, and may include a circular polarizing reflective layer 58a to reflect a first polarizing component and transmit a second polarizing component among the components of light emitted from the light guide plate 53, and a cholesteric liquid crystal layer 58b provided on the front surface of the circular polarizing reflective layer 58a to reflect or transmit the light transmitted through the circular polarizing reflective layer 58a.

The circular polarizing reflective layer 58a may be implemented as a cholesteric liquid crystal layer. In other words, the circular polarizing reflective layer 58a may be defined as a first cholesteric liquid crystal layer 58a, and the cholesteric liquid crystal layer 58b provided on the front surface of the circular polarizing reflective layer 58a may be defined as a second cholesteric liquid crystal layer 58b. The circular polarizing reflective layer 58a may reflect the first polarizing component and transmit the second polarizing component among the components of light emitted from the light guide plate 53. The first polarizing component may correspond to a right-circular polarization or a left-circular polarization, and the second polarizing component may correspond to a circular polarization in an opposite direction to the first polarizing component.

The cholesteric liquid crystal layer 58b may be classified into a plurality of regions, and a specific polarizing component among the components of light emitted from the light guide plate 53 may be reflected or transmitted by varying a state of the cholesteric liquid crystal for each region. That is, the plurality of regions of the cholesteric liquid crystal layer 58b correspond to a liquid crystal shutter whose states can be changed differently according to an applied voltage.

In other words, the cholesteric liquid crystal layer 58b may be classified into the plurality of regions, and each of the plurality of regions may reflect or transmit the second polarizing component that has passed through the circular polarizing reflective layer 58a according to the applied voltage.

The circular polarizing reflective layer 58a may be implemented so that the state of the cholesteric liquid crystal changes over the entire area. That is, the circular polarizing reflective layer 58a may not be classified into the plurality of regions. In this case, the circular polarizing reflective layer 58a may be implemented as a cholesteric liquid crystal film.

The cholesteric liquid crystal layer may include a cholesteric liquid crystal having a helical structure, and may have a characteristic of selectively reflecting or transmitting the right-circular polarization or the left-circular polarization among the components of light emitted from the light guide plate 53 according to the state of the cholesteric liquid crystal. That is, the cholesteric liquid crystal layer may separate incident light into right-circular polarization or left-circular polarization. However, since the cholesteric liquid crystal reflects only the left-circular polarization or the right-circular polarization depending on a direction of rotation of the helical structure, a contrast ratio is very low, below 2:1 when observed. In order to prevent a reduction of the contrast ratio, a circular polarizing reflective layer that reflects circular polarization in the opposite direction is required.

The state of the cholesteric liquid crystal may change according to the applied voltage. Changes in the state of the cholesteric liquid crystal and the reflection and transmission of light according thereto will be described in detail with reference to FIGS. 6 to 9 below.

Figure 3:
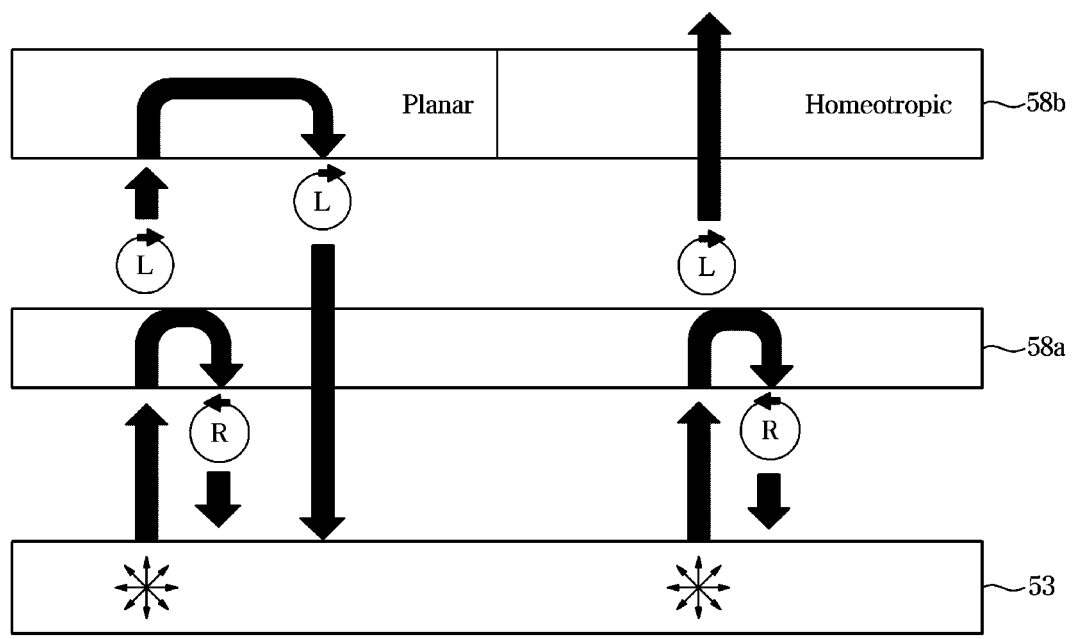
FIGS. 3 and 4 are views illustrating that local dimming is implemented in a backlight unit according to an embodiment.
Figure 4:
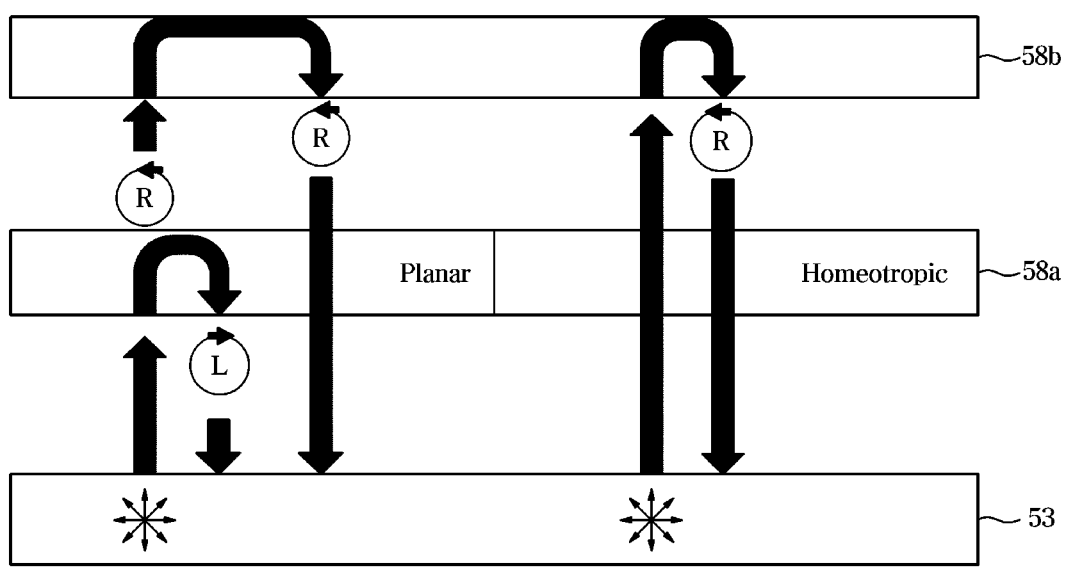

FIGS. 3 and 4 are views illustrating that local dimming is implemented in a backlight unit according to an embodiment.

Figure 5:
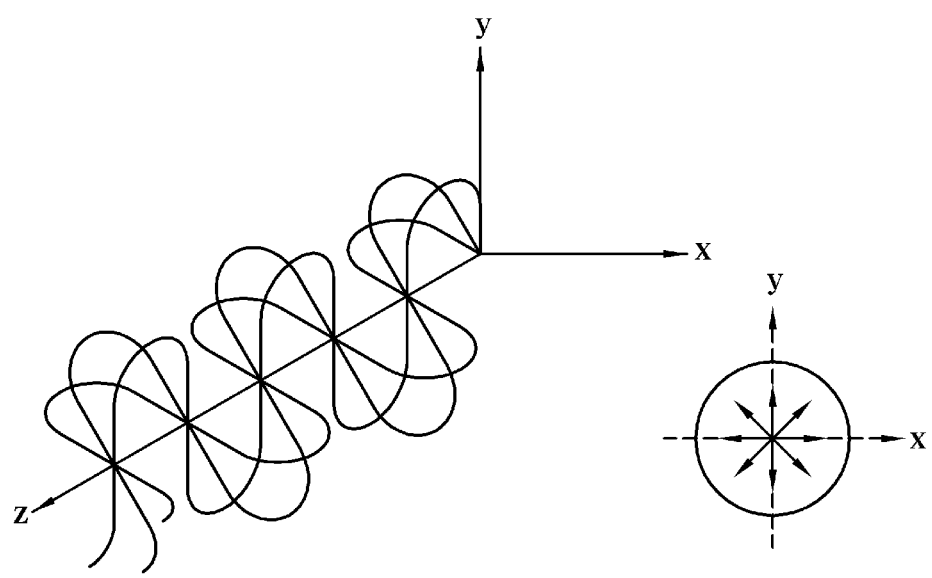
FIG. 5 is a view illustrating light emitted from a light guide plate of a backlight unit according to an embodiment.

Referring to FIG. 3, the light emitted from the light guide plate 53 may be incident on the circular polarizing reflective layer 58a. The light emitted from the light guide plate 53 may be propagated while vibrating electric and magnetic fields that are orthogonal to each other. As illustrated in FIG. 5, the electric or magnetic fields may be vibrated in a direction perpendicular to the proceeding direction (z-axis) (x-axis, y-axis) and proceed. The light emitted from the light guide plate 53 may have a mixed state of light vibrating in all directions perpendicular to the proceeding direction (z-axis).

In FIGS. 3 and 4, it is assumed that the circular polarizing reflective layer 58a is provided as the cholesteric liquid crystal film having a right helical structure, and the cholesteric liquid crystal layer 58b is a left helical structure and is provided in a structure having the plurality of regions.

When the light emitted from the light guide plate 53 enters the circular polarizing reflective layer 58a, the circular polarizing reflective layer 58a may reflect the first polarizing component, which is a polarizing component in the same direction as the helical structure, and may transmit the second polarizing component, which is a polarizing component opposite to the helical structure. That is, the circular polarizing reflective layer 58a may reflect the right-circular polarization and transmit the left-circular polarization.

The left-circular polarization that has passed through the circular polarizing reflective layer 58a may be reflected or transmitted according to the states of the plurality of regions of the cholesteric liquid crystal layer 58b. That is, among the plurality of regions of the cholesteric liquid crystal layer 58b, a region in a planar state reflects the second polarizing component, which is the left-circular polarization, and a region in a homeotropic state transmits the second polarizing component, which is the left-circular polarization.

The states of the plurality of regions of the cholesteric liquid crystal layer 58b vary according to the voltage applied to each. The plurality of regions of the cholesteric liquid crystal layer 58b may be switched according to the application of voltage. In other words, the planar region reflecting the second polarizing component may be changed to the homeotropic state or a focal conic state according to the applied voltage to transmit the second polarizing component.

Among the plurality of regions of the cholesteric liquid crystal layer 58b, pixels corresponding to the planar state are expressed darker than surrounding pixels, so that the black color may be expressed more deeply. Since pixels corresponding to the homeotropic state or the focal conic state are expressed brighter than the surrounding pixels, there is an effect of improving the contrast ratio.

Referring to FIG. 4, unlike FIG. 3, the backlight unit 50 may include the first cholesteric liquid crystal layer 58a divided into the plurality of regions instead of a circular polarizing reflective layer having the same state in the entire region. In other words, the backlight unit 50 may include the first cholesteric liquid crystal layer 58a divided into the plurality of regions and a second cholesteric liquid crystal layer 58b provided on the front surface of the first cholesteric liquid crystal layer 58a.

In FIG. 4, it is assumed that the first cholesteric liquid crystal layer 58a is provided with the left helical structure, and the second cholesteric liquid crystal layer 58b is provided with the right helical structure. Accordingly, the region in the planar state among the plurality of regions of the first cholesteric liquid crystal layer 58a may reflect the left-circular polarization and transmit the right-circular polarization. The region in the homeotropic state among the plurality of regions of the first cholesteric liquid crystal layer 58a may transmit both left-circular polarization and right-circular polarization. The second cholesteric liquid crystal layer 58b may reflect the right-circular polarization and transmit the left-circular polarization among the components of light transmitted through the first cholesteric liquid crystal layer 58b.

In FIG. 4, the entire second cholesteric liquid crystal layer 58b is illustrated to have the same state, but the second cholesteric liquid crystal layer 58b may also be divided into the plurality of regions.

Both the first cholesteric liquid crystal layer 58a and the second cholesteric liquid crystal layer 58b have the plurality of regions, and each of the plurality of regions may be individually changed according to the applied voltage. In this case, the first cholesteric liquid crystal layer 58a and the second cholesteric liquid crystal layer 58b may be provided with helical structures in opposite directions.

In other words, the first cholesteric liquid crystal layer 58a may be classified into a first plurality of regions, and may reflect or transmit the specific polarizing component among the components of light emitted from the light guide plate 53 by selectively changing states of the first plurality of regions. The second cholesteric liquid crystal layer 58b may be classified into a second plurality of regions, and may reflect or transmit the light transmitted through the first cholesteric liquid crystal layer 58a by selectively changing states of the second plurality of regions.

When both the first cholesteric liquid crystal layer 58a and the second cholesteric liquid crystal layer 58b have the plurality of regions, and the state of each of the plurality of regions is individually changed, an effect of improving the contrast and the brightness of the screen is greater.

As described above, the backlight unit 50 may implement local dimming in a matrix form despite employing the edge-type backlight unit. That is, by classifying the cholesteric liquid crystal layer into the plurality of regions and changing the state of each of the plurality of regions individually, the contrast ratio of the screen displaying the image may be improved.

Figure 6:
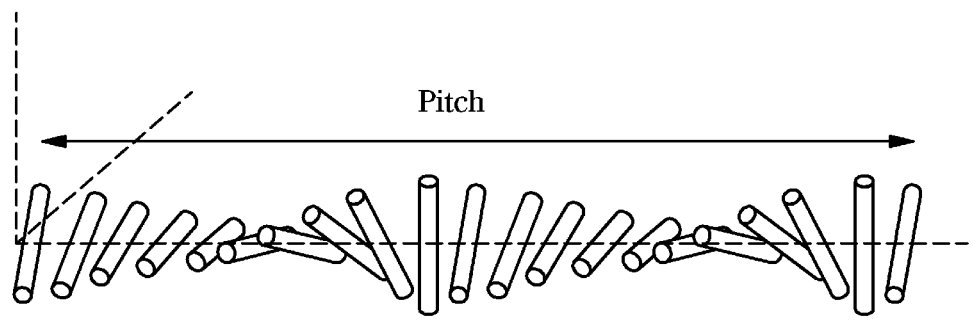
FIG. 6 is a view illustrating a structure of a cholesteric liquid crystal.

FIG. 6 is a view illustrating a structure of a cholesteric liquid crystal.

Referring to FIG. 6, the cholesteric liquid crystal may have a structure in which helical twisting of molecules is repeated at regular intervals. At this time, the interval at which the helical twisting of the molecules is repeated may be called a pitch. The cholesteric liquid crystal may have a characteristic of selectively reflecting light according to a twist direction and pitch of the helical.

The cholesteric liquid crystal may have a characteristic of selectively reflecting or transmitting the right-circular polarization or the left-circular polarization among the components of light emitted from the light guide plate 53 according to the direction of the helical and the state of the liquid crystal. That is, the cholesteric liquid crystal layer may separate incident light into the right-circular polarization or the left-circular polarization. When the polarization state rotates in a clockwise direction, it is referred to as the left-circular polarization, and when the polarization state rotates in a counterclockwise direction, it is referred to as the right-circular polarization.

A reflective wavelength band is determined by the pitch, and the wavelength at which reflection is maximum (2) may be determined by $\lambda = n \cdot p$ when an average refractive index of cholesteric liquid crystal molecules is n according to Bragg's law.

In order for the cholesteric liquid crystal to have the helical structure, a chiral dopant may be added, and the pitch may be adjusted according to the content of the chiral dopant. As the chiral dopant content increases, the pitch decreases and the reflective wavelength band decreases. Accordingly, color may be realized by artificially adjusting chiral characteristics to reflect the specific wavelength in a visible light region among external light incident on the cholesteric liquid crystal, or a transmittance of incident light may be increased to be transparent.

Figure 7:
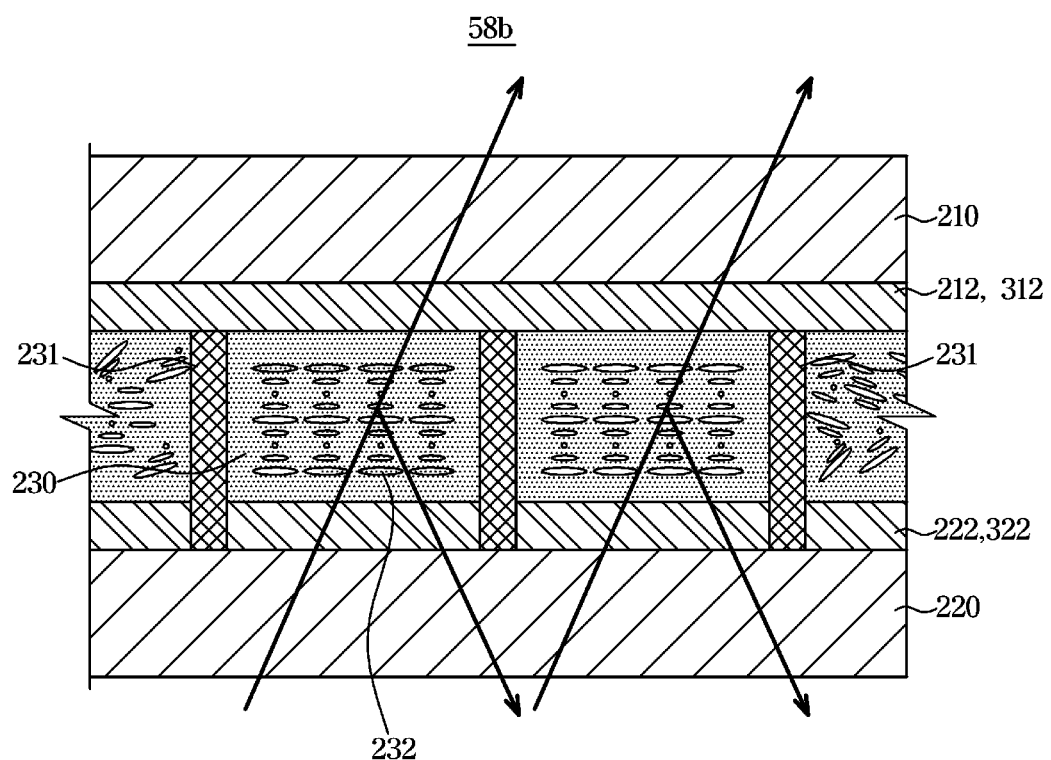
FIGS. 7 to 9 are views illustrating states of a cholesteric liquid crystal layer according to an application of voltage.
Figure 8:
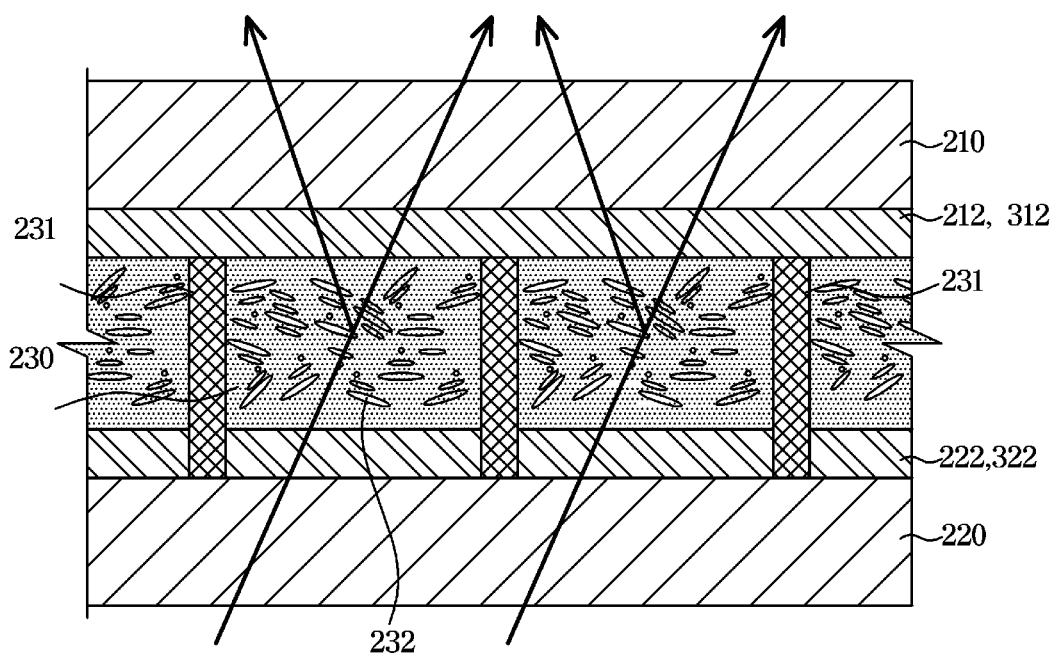
Figure 9:
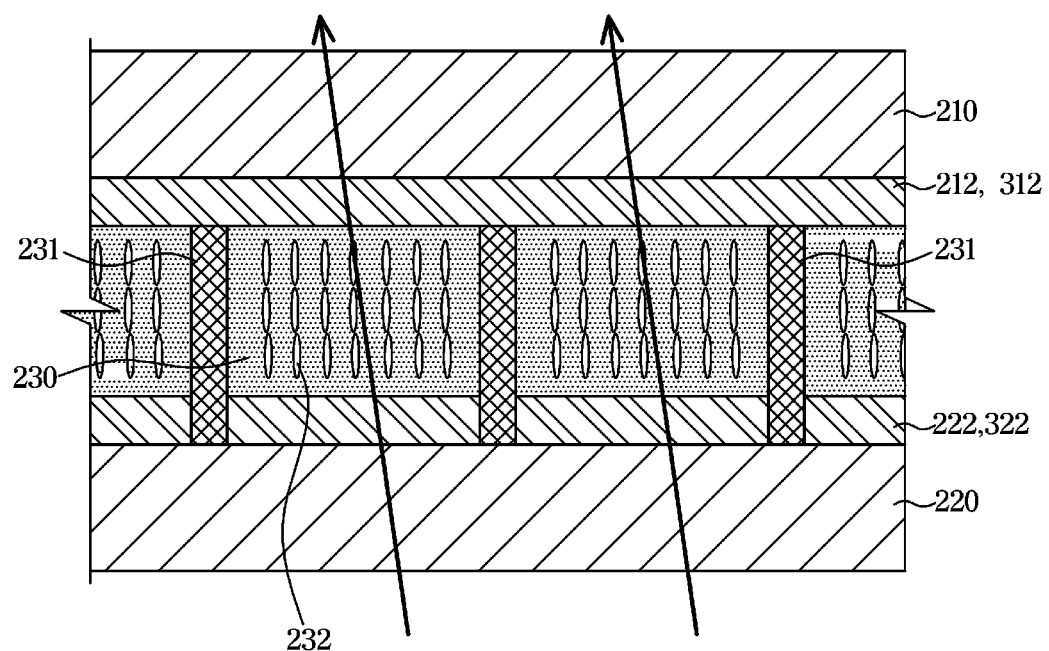

FIGS. 7 to 9 are views illustrating states of a cholesteric liquid crystal layer according to an application of voltage. FIG. 7 illustrates a liquid crystal arrangement in the planar state. FIG. 8 illustrates the liquid crystal arrangement in the focal conic state. FIG. 9 illustrates the liquid crystal arrangement in the homeotropic state.

Referring to FIGS. 7 to 9, the cholesteric liquid crystal 232 may have bistableness that can exit in two stable states: the planar state that reflects light in a state where no voltage is applied, and the focal conic state that scatters light. In addition, the cholesteric liquid crystal 132 may be converted to the homeotropic state capable of transmitting light based on a high voltage being applied. As described above, the cholesteric liquid crystal has a characteristic of bistable liquid crystal having two stable states, enabling passive matrix driving, and displaying the state even when the power is turned off.

The planar state may refer to a state in which a helical axis of the cholesteric liquid crystal 232 is arranged substantially perpendicular to a substrate, for example, a first substrate 210 and a second substrate 220, and the homeotropic state may refer to a state in which the helical axis of the cholesteric liquid crystal 232 is arranged substantially parallel to the first substrate 210 and the second substrate 220.

When a low voltage pulse is applied to the cholesteric liquid crystal 232 in the planar state, the cholesteric liquid crystals 232 become the focal conic state because the helical structure is unwisted. When the high voltage is continuously applied to the cholesteric liquid crystal 232 in the focal conic state, the liquid crystal molecules become the homeotropic state in which the liquid crystal molecules are arranged in an electric field direction. In the homeotropic state, it may be converted to the focal conic state by slowly reducing the applied voltage, and it may be converted to the planar state by rapidly removing the applied voltage. The liquid crystal structure of the focal conic state may also be formed when the high voltage applied to the liquid crystal in the homeotropic state is slowly lowered.

When the cholesteric liquid crystal 232 is in the planar state, it reflects a circular polarizing component in the same direction as the helical direction among the incident light components according to the helical direction of the liquid crystal, and transmits the circular polarizing component in the opposite direction to the helical direction. For example, when the helical structure of the cholesteric liquid crystal 232 is a right-circular structure, the cholesteric liquid crystal of the planar state may transmit a left-circular polarizing component and reflect a right-circular polarizing component among the components of light emitted from the light guide plate 53. The cholesteric liquid crystal 232 in the focal conic state may have a characteristic of scattering or diffusely reflecting light.

The cholesteric liquid crystal 232 may be provided in a space 230 partitioned by a partition wall 231. The separation of the cholesteric liquid crystal 232 by the partition wall 231 is only an example, and the cholesteric liquid crystals 232 may be separated by a capsule.

The cholesteric liquid crystals 232 provided in each space 230 are changed to the aforementioned homeotropic state, planar state, or focal conic state according to the voltage applied by a first electrode 212 and a second electrode 222, and may be transmitted or reflected the light emitted from the light guide plate 53.

When the backlight unit 50 includes the first cholesteric liquid crystal layer 58a having the first plurality of regions and the second cholesteric liquid crystal layer 58b having the second plurality of regions, electrodes may be provided on upper and lower surfaces of each of the first cholesteric liquid crystal layer 58a and the second cholesteric liquid crystal layers 58b, respectively.

Particularly, the first cholesteric liquid crystal layer 58a may include the first electrode 212 provided on an upper surface of the first cholesteric liquid crystal layer 58a and the second electrode 222 provided on a lower surface of the cholesteric liquid crystal layer 58a so that the voltage is selectively applied to each of the first plurality of regions. The second cholesteric liquid crystal layer 58b may include a third electrode 312 provided on the upper surface of the second cholesteric liquid crystal layer 58b and a fourth electrode 322 provided on the lower surface of the second cholesteric liquid crystal layer 58b so that the voltage is selectively applied to each of the second plurality of regions.

Figure 10:
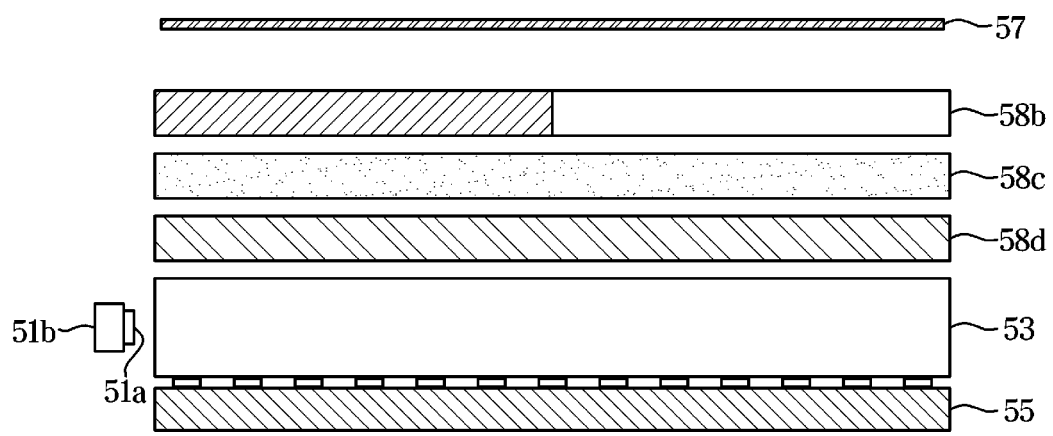
FIG. 10 is a view illustrating a structure of a backlight unit according to another embodiment.

FIG. 10 is a view illustrating a structure of a backlight unit according to another embodiment.

Referring to FIG. 10, the light regulator 58 of the backlight unit 50 may include a quarter wave plate (QWP) 58c, a polarizing film 58d, and the cholesteric liquid crystal layer 58b provided on the front of the light guide plate 53.

The QWP 58c may include an optically anisotropic thin plate made such that a light path difference of 214 is generated between two polarizing components vibrating in a direction perpendicular to each other with respect to a transmitted light having a wavelength of 2. When a linear polarization is incident vertically so that a vibration direction of the light is 45 degrees from a vibration direction of the incident light inside the QWP 58c, the light transmitted through the QWP 58c becomes the circular polarization, and conversely, when the circular polarization is incident, the light transmitted through the QWP 58c becomes the linear polarization. When an angle of rotation of an optic axis of the QWP 58c with respect to the vibration direction of the linear polarization is +45 degrees, the linear polarization becomes the left-circular polarization. When an angle of rotation of an optic axis of the QWP 58c with respect to the vibration direction of the linear polarization is −45 degrees, the linear polarization becomes the right-circular polarization.

The polarizing film 58d may be implemented as a reflective polarizing film capable of transmitting or reflecting incident light by linearly polarizing it. For example, the polarizing film 58d may be implemented using a dual brightness enhancement film (DBEF). Here, the DBEF may have a structure in which an isotropic film and an anisotropic film are intersected to each other to have a stacked structure, and may reflect or transmit the incident light by polarizing it using the structure.

The polarizing film 58d may be implemented to have a polarization axis in a direction different from the polarization axis of the linear polarization transmitted through the QWP 58c. When the linear polarization that has passed through the QWP 58c is incident on the polarizing film 58d, the polarizing film 58d reflects the incident light without transmitting it, thereby blocking the light from being emitted. In addition, when unpolarized light passes through the QWP 58c and enters the polarizing film 58d, the polarizing film 58d may transmit the linearly polarized light in a polarization axis direction of the polarizing film 58d.

Figure 11:
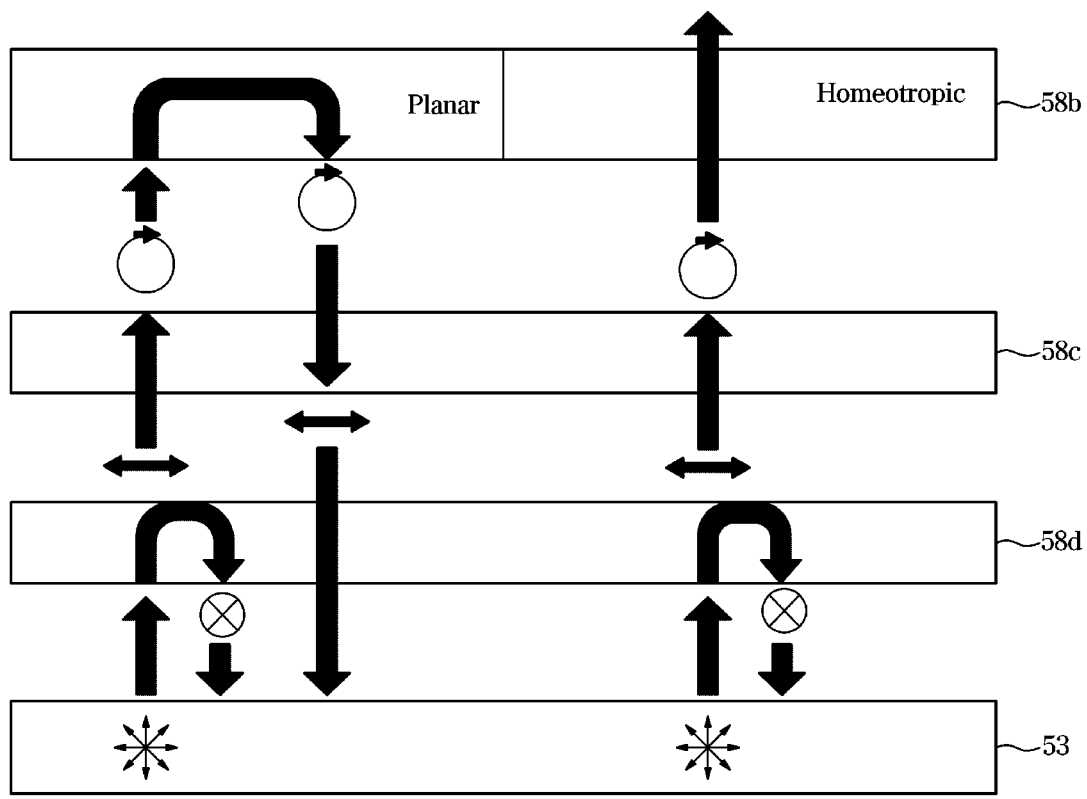
FIG. 11 is a view illustrating that local dimming is implemented in a backlight unit according to another embodiment.

FIG. 11 is a view illustrating that local dimming is implemented in a backlight unit according to another embodiment.

Referring to FIG. 11, the light emitted from the light guide plate 53 may enter the polarizing film 58d. The light emitted from the light guide plate 53 may be propagated while the electric field and the magnetic field orthogonal to each other vibrate. The light emitted from the light guide plate 53 may be propagated while vibrating electric and magnetic fields that are orthogonal to each other. As illustrated in FIG. 5, the electric or magnetic fields may be vibrated in a direction perpendicular to the proceeding direction (z-axis) (x-axis, y-axis) and proceed. The light emitted from the light guide plate 53 may have a mixed state of light vibrating in all directions perpendicular to the proceeding direction (z-axis).

In FIG. 11, it is assumed that the polarizing film 58d is formed of the DBEF that reflects vertical linear polarization and transmits horizontal linear polarization, the QWP 58c is provided to perform the left-circular polarization of the linear polarization, and the cholesteric liquid crystal layer 58b has the helical structure of the liquid crystal is provided in a left-hand structure.

When the light emitted from the light guide plate 53 enters the polarizing film 58d, the polarizing film 58d linearly polarizes the light to reflect vertical linear polarization and transmit horizontal linear polarization. The light of a horizontal linear polarization component that has passed through the polarizing film 58d is incident on the QWP 58c, and the QWP 58c transmits the horizontal linear polarization by right-circular polarization. Since the light transmitted through the QWP 58c is the left-circular polarization, the light may be reflected in the planar state and transmitted in the homeotropic state among the plurality of regions of the cholesteric liquid crystal layer 58b.

The light reflected from the cholesteric liquid crystal layer 58b may be re-incidated to the light guide plate 53 and recycled, thereby contributing to the improvement of brightness of the display apparatus. In addition, the pixel corresponding to the region in the planar state among the plurality of regions of the cholesteric liquid crystal layer 58b is expressed darker than that of the surrounding pixels, so that the black color may be expressed more deeply. Since the pixel corresponding to the region of the homeotropic state or the focal conic state is expressed brighter than the surrounding pixels, there is the effect of improving the contrast ratio.

Figure 12:
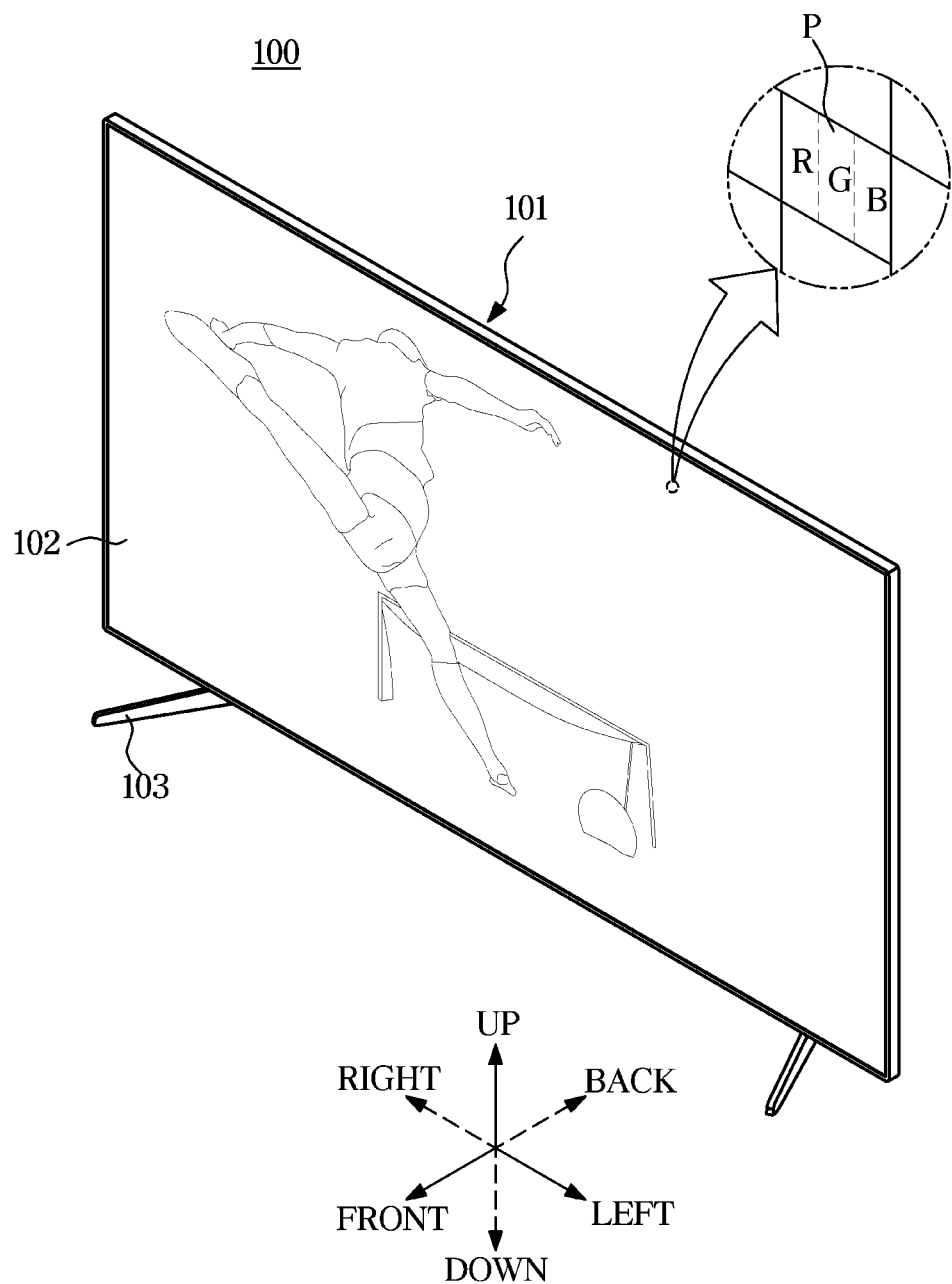
FIG. 12 is a view illustrating an exterior of a display apparatus according to an embodiment.

FIG. 12 is a view illustrating an exterior of a display apparatus according to an embodiment.

A display apparatus 100 is a device that processes an image signal received from the outside and visually displays the processed image. Hereinafter, a case in which the display apparatus 100 is a television is exemplified, but it is understood that embodiments are not limited thereto. For example, the display apparatus 100 may be implemented in various forms such as a monitor, a portable multimedia device, a portable communication device, and a portable computing device, and the display apparatus 100 is not limited in its shape as long as visually displaying an image.

Referring to FIG. 12, the display apparatus 100 may include a body 101, a screen 102 displaying the image, and a support 103 provided under the body 101 to support the body 101. The body 101 may form an outer shape of the display apparatus 100, and the body 101 may include a component configured to allow the display apparatus 100 to display an image or a component configured to perform a variety of functions. Although the body 101 is in the form of a flat plate, the shape of the body is not limited thereto. For example, the body 101 may have a shape in which the left end and the right end protrude forward and the central portion is curved so as to be concave.

The screen 102 is formed on the front surface of the body 101, and the screen 102 may display the image corresponding to visual information. For example, the screen 102 may display a still image or a moving image, and further display a two-dimensional plane image or a three-dimensional image using binocular disparity.

A plurality of pixels P may be formed on the screen 102 and an image displayed on the screen 102 may be formed by a combination of the lights emitted from the plurality of pixels P. For example, a single still image may be formed on the screen 102 by combining the light emitted by the plurality of pixels P as a mosaic.

Each of the plurality of pixels P may emit light of various brightness and various colors. For example, the plurality of pixels P may include a red pixel R, a green pixel G, and a blue pixel B to form an image in various colors. In this case, the red pixel R may emit red light of various brightness, the green pixel G may emit green light of various brightness, and the blue pixel B may emit blue light of various brightness. For example, the red light may represent a light beam having a wavelength of approximately 620 nanometers (nm) to 750 nm, the green light may represent a light beam having a wavelength of approximately 495 nm to 570 nm, and the blue light may represent a light beam having a wavelength of approximately 450 nm to 495 nm.

Each of the plurality of pixels P may include a configuration (for example, an organic light emitting diode) capable of emitting the light directly in order to emit the light of various brightness, or a configuration (for example, a liquid crystal panel) capable of transmitting or blocking the light emitted by a backlight unit or the like.

The support 103 is installed or provided under the body 101 so that the body 101 may stably maintain its position on the floor. Alternatively, the support 103 may be provided on the rear side of the body 101 so that the body 101 may be firmly fixed to the wall.

Although the support 103 has a bar shape protruding from the lower side of the body 101 to the front side, the shape of the support 103 is not limited thereto. That is, the support 103 may have a variety of shapes as long as stably supporting the body 101.

Figure 13:
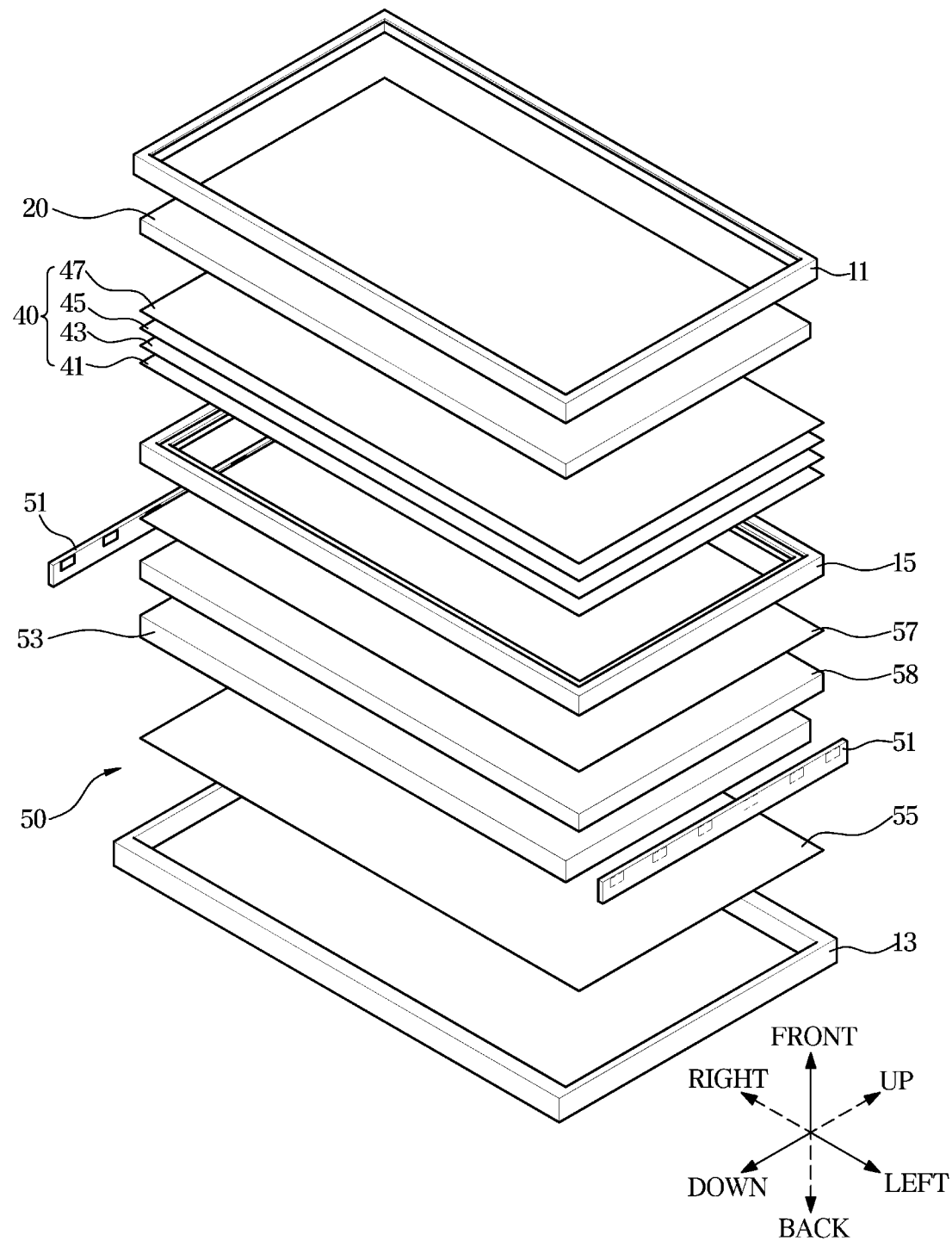
FIG. 13 is an exploded view illustrating a structure of a display apparatus according to an embodiment.
Figure 14:
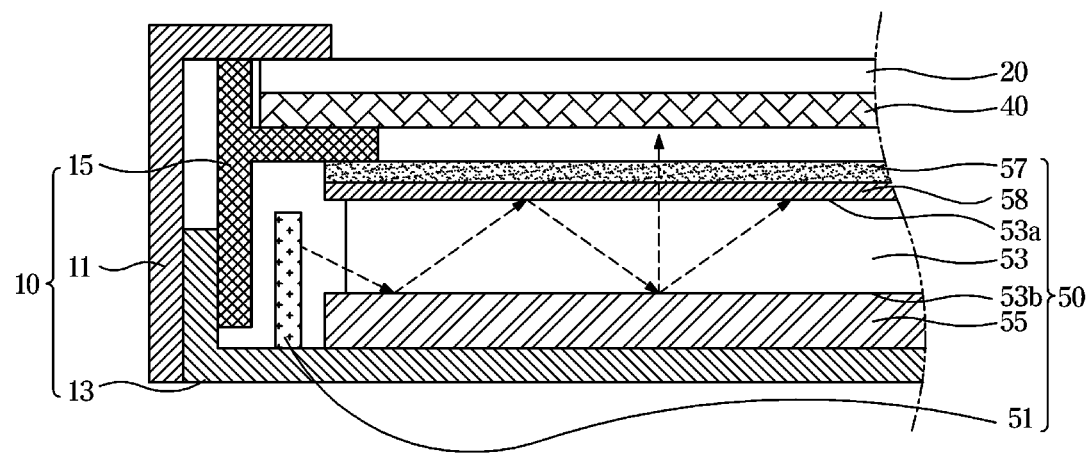
FIG. 14 is a side cross-sectional view illustrating a display apparatus according to an embodiment.

FIG. 13 is an exploded view illustrating a structure of a display apparatus according to an embodiment, and FIG. 14 is a side cross-sectional view illustrating a display apparatus according to an embodiment.

Referring to FIGS. 13 and 14, in the body 101, various components for generating the image on the screen 102 may be provided. In particular, the body 101 may include the backlight unit 50 emitting surface light, and a display panel 20 generating the image by transmitting or blocking light emitted from the backlight unit 50. In addition, the body 101 may further include a control assembly configured to control operations of the backlight unit 50 and the display panel 20, and a power assembly 150 configured to supply power to the backlight unit 50 and the display panel 20.

The display panel 20 may include a liquid crystal display (LCD) panel, a light emitting diode (LED) panel, or an organic light emitting diode (OLED) panel.

The body 101 may include a front chassis 11, a rear chassis 13, and a mold frame 15 to fix the display panel 20 and the backlight unit 50. The front chassis 11 may have a shape of a plate having an opening formed at a front surface thereof. A user may view an image generated by the display panel 20 through the opening in front of the front chassis 11.

The rear chassis 13 has a box shape having an open front surface and accommodates the display panel 20 and the backlight unit 50 constituting the display apparatus 100. The rear chassis 13 may prevent various component parts included in the display apparatus 100 from being exposed to the outside, and protect various component parts included in the display apparatus 100 from external shocks. The mold frame 15 may be arranged between the front chassis 11 and the rear chassis 13. In particular, the mold frame 15 may be provided between the display panel 20 and the backlight unit 50 to fix the display panel 20 and the backlight unit 50, respectively.

The display panel 20 may be provided in front of the backlight unit 50 and block or transmit the light emitted from the backlight unit 50 to form the image. The front of the display panel 20 may form the screen 102 of the display apparatus 100 and be composed of the plurality of pixels P.

The plurality of pixels P included in the display panel 20 may independently block or transmit the light from the backlight unit 50. The light transmitted by the plurality of pixels P may form the image displayed by the display apparatus 100. The display panel 20 may use the liquid crystal panel whose optical properties change according to the electric field. A structure of the display panel 20 that can be implemented as the liquid crystal panel will be described in detail in FIG. 15.

An optical sheet 40 may refract or scatter the light in order to widen a viewing angle of the display apparatus 100 and increase the brightness of the display apparatus 100. The optical sheet 40 may include various sheets. For example, the optical sheet 40 may include a diffusion sheet 41, a prism sheet 43, a protective sheet 45, and a dual brightness enhancement film (DBEF) 47.

The diffusion sheet 41 may spread the light emitted from the backlight unit 50 along a plane so that a color and brightness are uniform across the screen of the display apparatus 100. Since the light emitted from the light guide plate 53 is emitted through a pattern formed on the front surface 53a of the light guide plate 53, the pattern formed on the front surface 53a of the light guide plate 53 may be visually recognized from the light from the light guide plate 53. In order to prevent the pattern formed on the front surface 53a of the light guide plate 53 from being visually recognized in the light emitted from the light guide plate 53, the diffusion sheet 41 may spread the light emitted from the light guide plate 53 in the direction perpendicular to an emission direction.

In other words, the diffusion sheet may spread the light emitted from the backlight unit 50 to maintain uniform brightness of the entire surface. In another embodiment, instead of the diffusion sheet, a microlens sheet that spreads light and widens the viewing angle like the diffusion sheet may be used.

The light that has passed through the diffusion sheet 41 may be diffused in the direction perpendicular to the plane of the diffusion sheet 41, so that the brightness is rapidly reduced. The prism sheet 43 may increase the brightness by refracting or condensing light diffused by the diffusion sheet 41.

The prism sheet 43 may include a prism pattern in the shape of a triangular prism, and a plurality of prism patterns are arranged adjacent to each other to form a plurality of strips.

The protective sheet 45 may protect various components included in the backlight unit 50 from external impacts or foreign substances. In particular, the prism sheet 43 is susceptible to scratches, but the protective sheet 45 may prevent the prism sheet 43 from being scratched.

The DBEF 47 is a kind of polarizing film and is also called reflective polarizing film. The DBEF 47 may transmit the polarization in a direction parallel to the polarization direction of the DBEF 47 among the light emitted from the backlight unit 50, and reflect the polarization in a direction different from the polarization direction of the DBEF 47.

The light is known as a transverse wave that vibrates in the direction perpendicular to the proceeding direction. The polarizing film may transmit light vibrating in a specific direction among light vibrating in various directions, and absorb light vibrating in other directions.

In contrast, the DBEF 47 may reflect the polarization in the direction different from the polarization direction of the DBEF 47. Here, the reflected light is recycled inside the backlight unit 50, and the brightness of the display apparatus 100 may be improved by light recycling.

Figure 15:
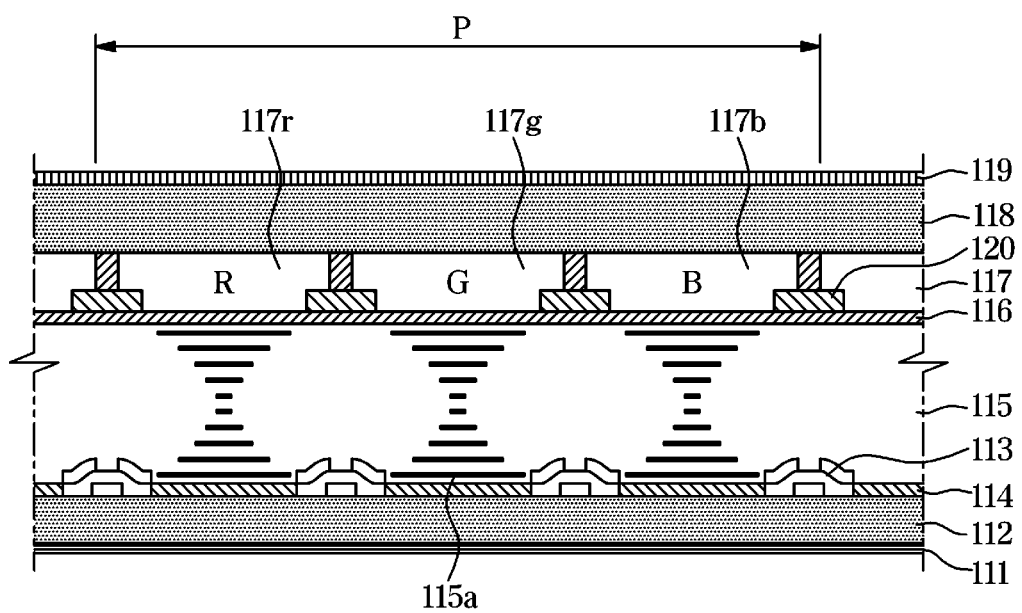
FIG. 15 is a view illustrating a structure of a display panel included in a display apparatus according to an embodiment.

FIG. 15 is a view illustrating a structure of a display panel included in a display apparatus according to an embodiment.

Referring to FIG. 15, the display panel 20 may include a first polarizing film 111, a first transparent substrate 112, a thin film transistor 113, a pixel electrode 114, a liquid crystal layer 115, a common electrode 116, a color filter 117, a second transparent substrate 118, and a second polarizing film 119.

The first transparent substrate 112 and the second transparent substrate 118 may form an appearance of the display panel 20, and may protect the liquid crystal layer 115 and the color filter 117 arranged between the first transparent substrate 112 and the second transparent substrate 118. The first transparent substrate 112 and the second transparent substrate 118 may be formed of tempered glass or transparent resin. The first polarizing film 111 and the second polarizing film 119 are provided outside the first transparent substrate 112 and the second transparent substrate 118.

The first polarizing film 111 transmits light having an electric field and a magnetic field oscillating in a first direction and blocks other light. In addition, the second polarizing film 119 transmits light having an electric field and a magnetic field oscillating in a second direction and blocks other light. At this time, the first direction and the second direction may be orthogonal to each other. In other words, the polarizing direction of the light transmitted by the first polarizing film 111 and the oscillating direction of the light transmitted by the second polarizing film 119 are orthogonal to each other. As a result, generally, light may not pass through both the first polarizing film 111 and the second polarizing film 119 at the same time.

The color filter 117 may be provided inside the second transparent substrate 118. The color filter 117 may include a red filter 117r transmitting red light, a green filter 117g transmitting green light, and a blue filter 117b transmitting blue light, and the red filter 117r, the green filter 117g and the blue filter 117b may be arranged parallel to each other.

The color filter 117 may include a black matrix 120 configured to prevent color interference between the red filter 117r, the green filter 117g and the blue filter 117b, and configured to block light of the backlight unit 300 to prevent light from being leaked toward other parts except for the red filter 117r, the green filter 117g and the blue filter 117b. The black matrix 120 is arranged between the red filter 117r, the green filter 117g, and the blue filter 117b.

A region in which the color filter 117 is formed or provided corresponds to the pixel P described above. In addition, a region in which the red filter 117r is formed or provided corresponds to the red pixel R, a region in which the green filter 117g is formed or provided corresponds to the green pixel G, and a region in which the blue filter 117b is formed or provided corresponds to the blue pixel B. In other words, the red filter 117r, the green filter 117g, and the blue filter 117b form the red pixel R, the green pixel G, and the blue pixel B. The pixel P is formed by the combination of the red filter 117r, the green filter 117g, and the blue filter 117b.

The thin film transistor (TFT) 113 is provided on the inner side of the first transparent substrate 112. In particular, the thin film transistor 113 may be formed at a position corresponding to between the red filter 117r, the green filter 117g, and the blue filter 117b. In other words, the thin film transistor 113 may be positioned between the red pixel R, the green pixel G, and the blue pixel B.

The thin film transistor 113 may transmit or block the current flowing through the pixel electrode 114, described below. For example, an electric field may be formed or removed between the pixel electrode 114 and the common electrode 116 in accordance with the turning on (closing) or turning off (opening) of the thin film transistor 113. The thin film transistor 113 may be composed of a poly-silicon, and the thin film transistor 113 may be formed by a semiconductor process such as lithography, deposition, or ion implantation process.

The pixel electrode 114 may be provided on the inner side of the thin film transistor 113 of the first transparent substrate 112. The common electrode 116 may be provided on the inner side of the color filter 117 of the second transparent substrate 118. The pixel electrode 114 and the common electrode 116 are formed of a conductive metal and may generate an electric field for changing the arrangement of liquid crystal molecules 115a forming the liquid crystal layer 115 described below.

The pixel electrode 114 may be formed or provided in a region corresponding to the red filter 117r, the green filter 117g, and the blue filter 117b, and the common electrode 116 may be formed or provided on the entire panel. As a result, an electric field may be selectively formed in a region corresponding to the red filter 117r, the green filter 117g, and the blue filter 117b, in the liquid crystal layer 25.

The pixel electrode 114 and the common electrode 116 may be formed of or include a transparent material and transmit light incident from the outside. For example, the pixel electrode 114 and the common electrode 116 may be formed of at least one of indium tin oxide (ITO), indium zinc oxide (IZO), Ag nano wire, a carbon nano tube (CNT), or graphene, 3,4-ethylenedioxythiophene (PEDOT). The liquid crystal layer 115 is formed or provided between the pixel electrode 114 and the common electrode 116, and the liquid crystal layer 115 includes the liquid crystal molecules 115*a*.

When the electric field is generated in the liquid crystal layer 115, the liquid crystal molecules 115*a* of the liquid crystal layer 115 may be arranged in the direction of the electric field. Conversely, when no electric field is generated in the liquid crystal layer 115, the liquid crystal molecules 115*a* may be arranged irregularly or arranged along an alignment layer. As a result, the optical properties of the display panel 20 may vary depending on the presence of an electric field in the liquid crystal layer 115.

For example, when the electric field is not formed or provided in the liquid crystal layer 115, the light polarized by the first polarizing film 111 may pass through the second polarizing film 119 due to the arrangement of the liquid crystal molecules 115*a* of the liquid crystal layer 115. In other words, the light may pass through the display panel 20, particularly, only a pixel P in which the electric field is not formed, in the liquid crystal layer 115.

On the other hand, when an electric field is formed in the liquid crystal layer 115, light polarized by the first polarizing film 111 does not pass through the second polarizing film 119 due to the arrangement of the liquid crystal molecules 115*a* of the liquid crystal layer 115. In other words, light is blocked by the display panel 20, in particular, a pixel P in which the electric field is formed, in the liquid crystal layer 115.

The display panel 20 may independently control light transmittance for each pixel P (more particularly, the red pixel, the green pixel, and the blue pixel included in the pixels). As a result, the light from the plurality of pixels P is combined, so that the image may be displayed on the screen 102 of the display apparatus 100.

While various example embodiments of the disclosure have been illustrated and described with reference to the accompanying drawings, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

The invention claimed is:

1. A backlight unit comprising:
a light guide plate;
a light source provided on a side surface of the light guide plate, and configured to inject light into the light guide plate;
a circular polarizing reflective layer provided on a front surface of the light guide plate, and configured to reflect a first polarizing component and transmit a second polarizing component among components of light emitted from the light guide plate; and
a cholesteric liquid crystal layer provided on the front surface of the circular polarizing reflective layer and including a plurality of regions, and configured to reflect or transmit the second polarizing component that has passed through the circular polarizing reflective layer according to a voltage applied to each of the plurality of regions.

2. The backlight unit according to claim 1, wherein:
the cholesteric liquid crystal layer comprises a first electrode provided on an upper surface of the cholesteric liquid crystal layer and a second electrode provided on a lower surface of the cholesteric liquid crystal layer for selectively applying a voltage to the each of the plurality of regions; and
the each of the plurality of regions is configured to change to one of a planar state, a homeotropic state, or a focal conic state according to the applied voltage.

3. The backlight unit according to claim 1, wherein the circular polarizing reflective layer is a cholesteric liquid crystal layer having a helical structure in the same direction as the first polarizing component.

4. The backlight unit according to claim 1, further comprising:
a quantum dot sheet provided on the front surface of the cholesteric liquid crystal layer,
wherein the light source is a blue light emitting diode (LED).

5. The backlight unit according to claim 1, wherein:
the first polarizing component is right-circular polarization or left-circular polarization; and
the second polarizing component is circular polarization opposite to the first polarizing component.

6. A backlight unit comprising:
a light guide plate;
a light source provided on a side surface of the light guide plate, and configured to inject light into the light guide plate;
a first cholesteric liquid crystal layer provided on the front surface of the light guide plate and divided into a first plurality of regions, and configured to selectively change states of the first plurality of regions to reflect or transmit a specific polarizing component among components of light emitted from the light guide plate; and
a second cholesteric liquid crystal layer provided on the front surface of the first cholesteric liquid crystal layer and divided into a second plurality of regions, and configured to selectively change states of the second plurality of regions to reflect or transmit light transmitted through the first cholesteric liquid crystal layer.

7. The backlight unit according to claim 6, wherein the first cholesteric liquid crystal layer and the second cholesteric liquid crystal layer are configured to have helical structures in opposite directions to each other.

8. The backlight unit according to claim 6, wherein each of the first plurality of regions of the first cholesteric liquid crystal layer and each of the second plurality of regions of the second cholesteric liquid crystal layer is configured to change to one of a planar state, a homeotropic state, or a focal conic state according to an applied voltage.

9. The backlight unit according to claim 6, wherein:
the first cholesteric liquid crystal layer comprises a first electrode provided on an upper surface of the first cholesteric liquid crystal layer and a second electrode provided on a lower surface of the first cholesteric liquid crystal layer for selectively applying a voltage to each of the first plurality of regions; and
the second cholesteric liquid crystal layer comprises a third electrode provided on an upper surface of the second cholesteric liquid crystal layer and a fourth electrode provided at a lower surface of the second cholesteric liquid crystal layer for selectively applying a voltage to each of the second plurality of regions.

10. The backlight unit according to claim 6, further comprising:
a quantum dot sheet provided on the front surface of the second cholesteric liquid crystal layer,
wherein the light source is a blue light emitting diode (LED).

11. A display apparatus comprising:
a backlight unit; and
a display panel provided in front of the backlight unit,
wherein the backlight unit further comprises:
a light guide plate;
a light source provided on a side surface of the light guide plate, and configured to inject light into the light guide plate;
a circular polarizing reflective layer provided on a front surface of the light guide plate, and configured to reflect a first polarizing component and transmit a second polarizing component among components of light emitted from the light guide plate; and
a cholesteric liquid crystal layer provided on the front surface of the circular polarizing reflective layer and including a plurality of regions, and configured to reflect or transmit the second polarizing component that has passed through the circular polarizing reflective layer according to a voltage applied to each of the plurality of regions.

12. The display apparatus according to claim 11, wherein:
the cholesteric liquid crystal layer comprises a first electrode provided on an upper surface of the cholesteric liquid crystal layer and a second electrode provided on a lower surface of the cholesteric liquid crystal layer for selectively applying a voltage to the each of the plurality of regions; and
the each of the plurality of regions is configured to change to one of a planar state, a homeotropic state, or a focal conic state according to the applied voltage.

13. The display apparatus according to claim 11, wherein the circular polarizing reflective layer is a cholesteric liquid crystal layer having a helical structure in the same direction as the first polarizing component.

14. The display apparatus according to claim 11, wherein:
the backlight unit further comprises a quantum dot sheet provided on the front surface of the cholesteric liquid crystal layer; and
the light source is a blue light emitting diode (LED).

15. The display apparatus according to claim 11, wherein:
the first polarizing component is right-circular polarization or left-circular polarization; and
the second polarizing component is circular polarization opposite to the first polarizing component.

* * * * *